(12) United States Patent
Huang et al.

(10) Patent No.: US 11,705,096 B2
(45) Date of Patent: Jul. 18, 2023

(54) AUTONOMOUS GENERATION OF MELODY

(71) Applicant: Microsoft Technology Licensing, LLC, Redmond, WA (US)

(72) Inventors: Shaohan Huang, Redmond, WA (US); Lei Cui, Beijing (CN); Tao Ge, Redmond, WA (US); Furu Wei, Redmond, WA (US); Ming Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 17/051,409

(22) PCT Filed: May 24, 2019

(86) PCT No.: PCT/US2019/033866
§ 371 (c)(1),
(2) Date: Oct. 28, 2020

(87) PCT Pub. No.: WO2019/231835
PCT Pub. Date: Dec. 5, 2019

(65) Prior Publication Data
US 2021/0158790 A1    May 27, 2021

(30) Foreign Application Priority Data

Jun. 1, 2018    (CN) .......................... 201810558917.1

(51) Int. Cl.
*G10H 1/00*      (2006.01)
*G06N 20/00*    (2019.01)
(52) U.S. Cl.
CPC ........... *G10H 1/0025* (2013.01); *G06N 20/00* (2019.01); *G10H 2210/111* (2013.01);
(Continued)

(58) Field of Classification Search
CPC ........... G10H 1/0025; G10H 2210/111; G10H 2220/351; G10H 2240/081; G10H 2250/311; G06N 20/00
See application file for complete search history.

(56) References Cited

U.S. PATENT DOCUMENTS 5,801,694 A    9/1998  Gershen
6,051,770 A    4/2000  Milburn et al.
(Continued)

FOREIGN PATENT DOCUMENTS

CN    101160615 A    4/2008
CN    101916240 A    12/2010
(Continued)

OTHER PUBLICATIONS

Teng et al., Generating Nontrivial Melodies for Music as a Service, 18th International Society for Music Information Retrieval Conference, Suzhou, China, 2017 (Year: 2017).*
(Continued)

*Primary Examiner* — Jianchun Qin
(74) *Attorney, Agent, or Firm* — Schwegman Lundberg & Woessner, P.A.

(57) ABSTRACT

Implementations of the subject matter described herein provide a solution that enables a machine to automatically generate a melody. In this solution, user emotion and/or environment information is used to select a first melody feature parameter from a plurality of melody feature parameters, wherein each of the plurality of melody feature parameters corresponds to a music style of one of a plurality of reference melodies. The first melody feature parameter is further used to generate a first melody that conforms to the music style and is different from the reference melody. Thus, a melody that matches user emotions and/or environmental information may be automatically created.

20 Claims, 4 Drawing Sheets

(52) U.S. Cl.
CPC . *G10H 2220/351* (2013.01); *G10H 2240/081* (2013.01); *G10H 2240/085* (2013.01); *G10H 2250/311* (2013.01)

(56) References Cited

U.S. PATENT DOCUMENTS

| | | | |
|---|---|---|---|
| 6,084,169 | A | 7/2000 | Hasegawa et al. |
| 8,878,043 | B2 | 11/2014 | Cheever et al. |
| 2008/0257133 | A1 | 10/2008 | Sasaki et al. |
| 2014/0052282 | A1* | 2/2014 | Balassanian ............ G06F 16/61 700/94 |
| 2014/0254831 | A1 | 9/2014 | Patton |
| 2015/0179157 | A1 | 6/2015 | Chon et al. |
| 2017/0092247 | A1* | 3/2017 | Silverstein ............. G06N 20/00 |
| 2017/0103740 | A1 | 4/2017 | Hwang et al. |

FOREIGN PATENT DOCUMENTS

| | | |
|---|---|---|
| EP | 3166102 A1 | 5/2017 |
| GB | 2551807 A | 1/2018 |

OTHER PUBLICATIONS

Brunner et al., "MIDI-VAE: Modeling Dynamics and Instrumentation of Music with Applications to Style Transfer", In Proceedings of the 19th International Society for Music Information Retrieval Conference, Sep. 20, 2018, 8 Pages.

"International Search Report and Written Opinion issued in PCT Application No. PCT/US19/033866", dated Sep. 12, 2019, 12 Pages.

"Notice of Allowance Issued in European Patent Application No. 19730631.9", dated Dec. 1, 2022, 7 Pages.

"Office Action Issued in Chinese Patent Application No. 201810558917.1", dated Nov. 23, 2022, 16 Pages.

Roberts, et al., "A Hierarchical Latent Vector Model for Learning Long-Term Structure in Music", In Repository of arXiv:1803.05428v1, Mar. 13, 2018, 15 Pages.

"Decision to Grant Issued In European Patent Application No. 19730631.9", dated Mar. 10, 2023, 2 Pages.

"Notice of Allowance Issued in Chinese Patent Appliation No. 201810558917.1", dated Apr. 20, 2023, 4 Pages.

* cited by examiner ated that the computing environment 100 shown in FIG. 1 is
AUTONOMOUS GENERATION OF MELODY

CROSS-REFERENCE TO RELATED APPLICATION

This application is a U.S. National Stage Filing under 35 U.S.C. 371 of International Patent Application Serial No. PCT/US2019/033866, filed May 24, 2019, and published as WO 2019/231835 A1 on Dec. 5, 2019, which claims priority to Chinese Application No. 201810558917.1, filed Jun. 1, 2018; which applications and publication are incorporated herein by reference in their entirety.

BACKGROUND

Music is an art form appreciated and loved by people, and already penetrates deeply in people's life. In different situations, people might desire to hear music which is compliant with the current situation. However, conventional music play is generally based on a music list, and it is difficult for automatic adjustment according to factors such as the user's emotion and environment. In addition, switching different songs in the music list usually requires the user's manual operations.

SUMMARY

In accordance with implementations of the subject matter described herein, there is proposed a solution that supports a machine to automatically generate a melody. In this solution, a user emotion and/or environment information is used to select a first melody feature parameter from a plurality of melody feature parameters, wherein each of the plurality of melody feature parameters corresponds to a musical style of one of a plurality of reference melodies. The first melody feature parameter is further used to generate a first melody that conforms to the musical style and is different from the reference melodies. Thus, it is possible to automatically generate a melody that matches user emotions and/or environmental information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "comprises" and its variants are to be read as open terms that mean "comprises, but is not limited to." The term "based on" is to be read as "based at least in part on." The terms "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

As discussed above, in conventional music play, it is difficult to automatically adjust a style of the played music according to different situations. In many cases, a manual selection is always required if music matching with the current situation is to be played. As artificial intelligence develops constantly, it is desirable to automatically generate music matching with the current situation.

According to some implementations of the subject matter described herein, there is provided a computer-implemented solution of automatically generating a melody. In this solution, a plurality of predetermined melody feature parameters are provided, and each of the melody feature parameters characterizes music note distribution of one of a plurality of reference melodies and corresponds to a music style of the reference melody. The user's emotions and/or environment information, e.g., physical environment situations and the user's physiological properties, are detected to select a melody feature parameter from the plurality of melody feature parameters, to generate a melody compliant with the corresponding music style. Through the solution of the subject matter described herein, It is possible to automatically generate a melody matching with user's emotions and/or environment information.

Reference is made below to figures to describe basic principles and several example implementations of the subject matter described herein.

EXAMPLE ENVIRONMENT

Figure 1:
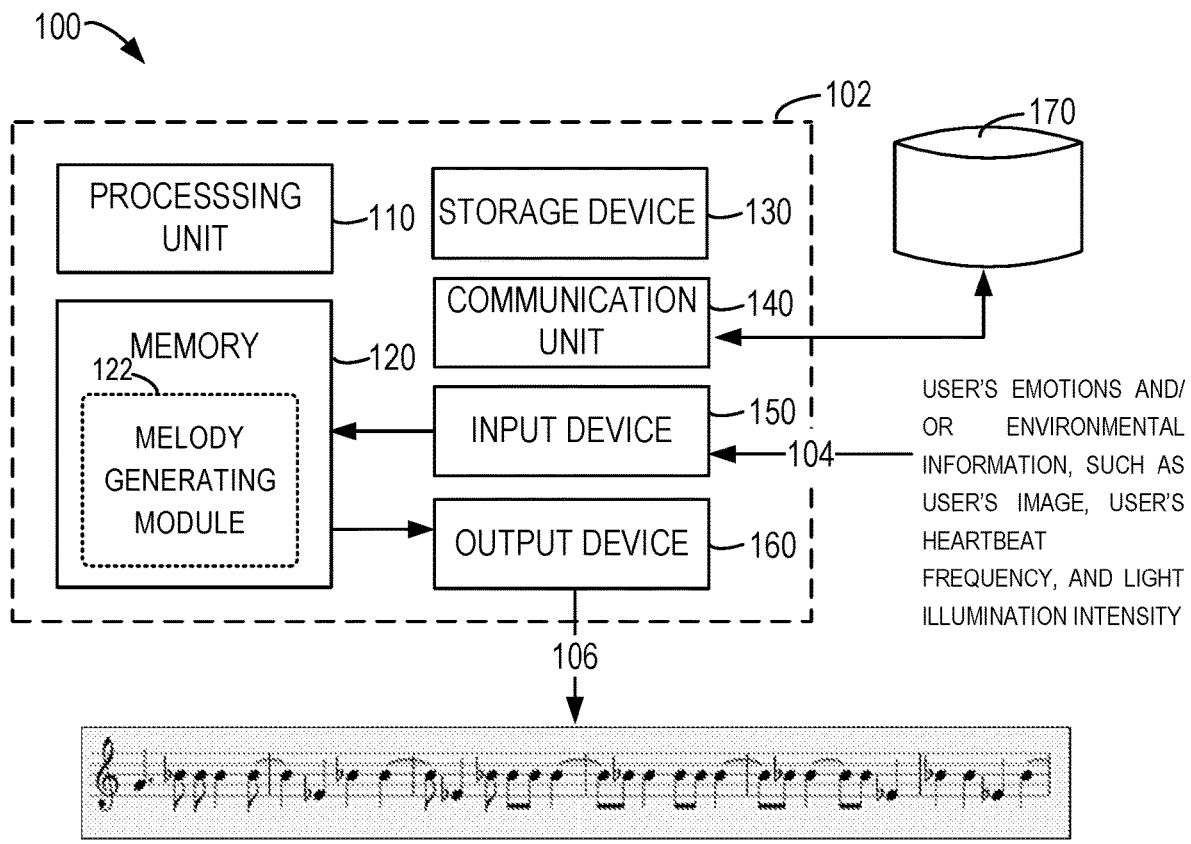
FIG. 1 illustrates a block diagram of a computing environment in which various implementations of the subject matter described herein can be implemented.

FIG. 1 illustrates a block diagram of a computing environment 100 in which implementations of the subject matter described herein can be implemented. It would be appreciated that the computing environment 100 shown in FIG. 1 is merely for illustration and should not be considered as any limitation to the function and scope of implementations of the subject matter described herein in any manners. As shown in FIG. 1, the computing environment 100 comprises a computing device 102 in form of a general-purpose computing device. Components of the computing device 102 may include, but are not limited to, one or more processors or processing units 110, a memory 120, a storage device 130, one or more communication units 140, one or more input devices 150, and one or more output devices 160.

In some implementations, the computing device 100 can be implemented as a variety of user terminals or serving terminals. A serving terminal may be a server provided by a respective service provider, large-scale computing device, or the like. The user terminal may be any type of mobile terminal, fixed terminal or portable terminal, such as mobile telephone, station, unit, device, multimedia computer, multimedia tablet, Internet node, communicator, desk-top computer, laptop computer, notable computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device or any combinations thereof, including accessories and peripherals of these devices or any combinations thereof. It would be appreciated that the computing device 100 can support any type of interface for a user (such as a "wearable" circuit.)

The processing unit 110 may be a physical or virtual processor and can implement various processes based on programs stored in the memory 120. In a multi-processor system, a plurality of processing units execute computer executable instructions in parallel so as to improve parallel processing capability of the computing device 102. The processing unit 110 may also be referred to as a central processing unit (CPU), a microprocessor, a controller, or a microcontroller.

The computing device 102 generally comprises various computer storage medium. The computer storage medium can be any medium accessible by the computing device 102, including but not limited to volatile and non-volatile medium, and removable and non-removable medium. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The memory 120 may include one or more program melody generating modules 122, and these program modules are configured to perform functions of various implementations described herein. The melody generating module 122 may be accessed and run by the processing unit 110 to implement corresponding functions. The storage device 130 can be any removable and non-removable medium and may include machine-readable medium, which can be used for storing information and/or data and can be accessed in the computing device 102.

Functions of the components of the computing device 102 may be implemented in a single computing cluster or multiple computers, and these computers can communicate through communicative connection. Therefore, the computing device 102 can operate in a networking environment using a logical connection with one or more other servers, personal computers (PCs) or further general network nodes. By means of the communication unit 140, the computing device 102 can further communicate with one or more external devices (not shown) if required, the external device being for example a database 170, other storage devices, a server and a display device, with one or more devices enabling the user to interact with the computing device 102, or any devices (such as a network card, a modem and the like) enabling the computing device 102 to communicate with one or more other computing devices. Such communication can be performed via input/output (I/O) interfaces (not shown).

The input device 150 may include one or more of a variety of input devices, such as a mouse, a keyboard, a tracking ball, a voice-input device, and the like. The output device 160 may include one or more of a variety of output devices, such as a display, a loudspeaker, a printer, and the like.

The computing device 102 may be used to automatically generate a melody. To execute melody generation, the computing device 102 receives user's emotion and environment information 104 via the input device 150. Depending on specific scenarios, different types of input devices 150 may be used to receive user's emotion and/or environment information 104. In some implementations, user's emotion and/or environment information 104 may be obtained via a detection device external to the computing device 102. For example, user's emotion and/or environment information 104 may be received via a speech input device, a camera, a light intensity detector external to the computing device 102. The user's emotion and/or environment information 104 is used as an input to the melody generating module 122. The processing unit 110 of the computing device 102 can run the melody generating module 122 to select, based on the user's emotion and/or environment information 104, a melody feature parameter matching with a contextual environment, and thereby generating a corresponding melody 106. In some implementations, the melody generating module 122 provides the generated melody 106 as an output to the output device 160, and output the generated melody 106 via the output device 160 (e.g., play via a loudspeaker, and/or display via a display).

Example implementations of automatically generating a melody in the melody generating module 122 are discussed below in detail.

Example Process

Figure 2:
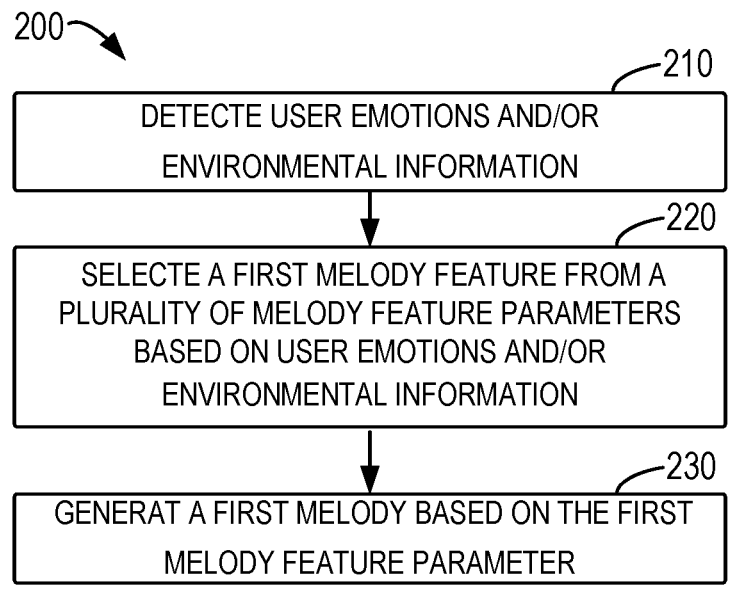
FIG. 2 illustrates a flow chart of a melody generating process according to some implementations of the subject matter described herein.

FIG. 2 illustrates a flow chart of a process 200 of automatically generating a melody according to some implementations described herein. The process 200 may be implemented by the computing device 102, for example, implemented by the melody generating module 122 of the computing device 102.

At 210, the computing device 102 detects a user's emotion and/or environment information 104. The user's emotion and/or environment information 104 refers to emotional status for the user of the computing device 102 and/or physical environment situations around the computing device 102. The user's emotion and/or environment information 104 may be detected in real time by the computing device 102 or associated device, or be directly received from an external device. In implementations of the subject matter described herein, the user's emotion and/or environment information 104 may be used to guide the generation of the melody.

The user's emotion may be determined by detecting the user's physiological property. The physiological property refers to physiological characteristics associated with the user of the computing device 102 or specific physiological parameters, including but not limited to one or more of: the user's facial expression or whole-body posture, the user's heartbeat, the user's pulse, the user's blood pressure, the number of step number of the user in the current day, and calories consumed by the user in the current day. When the user is in different physiological statuses, music in different styles is appropriate to be played. For example, when the user's heartbeat is fast, it is appropriate to play motional music; when the user's heartbeat is gentle, it is appropriate to play soft music. In some implementations, the computing device 102 may detect the user's physiological properties via one or more sensors (e.g., a heartbeat sensor, a pulse sensor, a blood pressure sensor and a step number sensor and so on). The user's different facial expressions or postures might convey the user's different emotions (e.g., happiness or sadness and the like), and melodies in different styles are also more appropriate.

The user's emotion may also be determined by receiving the user's input. In some implementations, the computing device 102 may receive speech, words, video, picture or music input by the user to determine the user's emotion. The computing device 102 may employ a technology, such as natural language processing, to analyze the user's input, and thereby determine a music style matching with the user's input. For example, if the user inputs some sad words, it is appropriate to play soft music; if the user inputs some happy words, it is proper to play dynamic music. For example, if the user inputs a video of a happy party with friends, it is proper to play dynamic music. The computing device 102 may recommend this music to the user as background music for the input video.

The physical environment situations refer to physical environment situations where the computing device 102 is in, including but not limited to one or more of: noise level, light intensity, environment humidity, environment temperature, a movement speed of the device, an altitude of the device, and a location of the device. Different styles of music are usually adapted for different physical environment situations, for example, in a very noisy physical environment (e.g., a shopping mall, an amusement park, a gymnasium or a restaurant), it is usually appropriate to play brisk or dynamic music such as rock and roll or dance music; in a less noisy environment (e.g., a library or café), it is generally appropriate to play soft music such as classic or lyric music. In some implementations, the computing device 102 may detect the physical environment situations via one or more sensors (e.g., an image sensor, a sound sensor, a light intensity sensor, a humidity sensor, a temperature sensor, a speed sensor, an altitude sensor, a location sensor and so on).

Instead of or in addition to the user's emotion and/or environment information discussed above, the user's emotion and/or environment information 104 may further comprise information such as the user's calendar information and the user's historical music play records and the like. These information may be used to determine, alone or complementarily, what styles of music are adapted to be played, and thereby may be extracted to guide subsequent melody generation.

At 220, the computing device 102 selects a melody feature parameter (referred to as a first melody feature parameter for ease of description) from a plurality of melody feature parameters based on the user's emotion and/or environment information 104. The plurality of melody feature parameters may be obtained from a plurality of reference melodies, and each melody feature parameter corresponds to the music style for one reference melody in the plurality of reference melodies. Hence, such melody feature parameters may be used to generate a desired melody.

In some implementations, the computing device 102 may obtain a plurality of reference melodies in a plurality of music styles, and determine one or more music styles corresponding to each reference melody of the plurality of reference melodies through manual annotation or other automatic analysis technologies. Hence, the melody feature parameter generated by each reference melody corresponds to the music style of the reference melody. The plurality of melody feature parameters may be stored, and used as a basis for subsequent melody generation. Generation of the melody feature parameters will be described below in detail.

In some implementations, the computing device 102 may, based on the user's emotion and/or environment information 104, determine a music style matching with the user's emotion and/or environment information 104, and select, based on the determined music style, the first melody feature parameter corresponding to the same matched music style. In some implementations, the music style refers to different music genres, for example, rock and roll, pop, jazz, blues and country music and the like. In some implementations, music style may further refer to an emotional label corresponding to the melody, for example, brisk, sad, angry, happy, and anxious and the like. In some implementations, the music style may further be classified based on different rhythm styles, for example, different melodies may be classified into music styles such as fast speed, medium speed or slow speed. In some implementations, a single melody may be associated with a single music style. In some implementations, a single melody may have multiple different music styles, for example, rock and roll, brisk and fast speed. It should be appreciated that the music style in the text is only a kind of label for classifying music or melody, and any proper classification basis may be employed to classify the music style of the melody.

Depending on the type of the user's emotion and/or environment information 104, the computing device 102 may employ different analysis technologies to determine the music style matching with the user's emotion and/or environment information 104. In some implementations, if the user's emotion and/or environment information 104 is some information such as sound intensity, light intensity, temperature and humidity of the environment, the computing device 102 may determine the music style matching with the user's emotion and/or environment information 104 by comparing the detected value with a predetermined threshold. For example, if the device 102 detects that the sound intensity is greater than the predetermined threshold, the music style matching with the user's current emotion and/or environment information may be determined as "brisk".

In another example, if the user's emotion and/or environment information 104 is image information, the computing device 102 may analyze objects and persons included within the image as well as information such as expression, posture and mood of these objects and persons through image analysis technologies, such as image recognition, facial recognition, posture recognition, expression detection, gender and age detection and the like, and thereby determine the music style matching with the user's emotion and/or environment information 104. For example, if the computing device 102 detects that the user's current expression is sad through image detection, the music style matching with the user's current emotion and/or environment information may be determined as "blues".

In another example, if the user's emotion and/or environment information 104 is the user's calendar information, the computing device may analyze the itinerary information through natural language processing or text analysis technology, to determine the music style matching with the user's emotion and/or environment information 104. For example, if the user's calendar information is "16:00-18:00 hold a meeting with classmates", the computing device 102 may perform semantic analysis for the calendar information, and the music style matching with the user's emotion and/or environment information in this time period may be determined as "joyous".

In some implementations, a single music style may be associated with a plurality of reference melodies, namely, there may be a plurality of melody feature parameters which are corresponding to a single music style. In some implementations, the computing device 102 may select randomly a melody feature parameter from a plurality of corresponding melody feature parameters stored, as the first melody feature parameter. In some implementation, the computing device 102 may further select randomly a melody feature parameter which is not previously used from a plurality of corresponding melody feature parameters stored as the first melody feature parameter, such that a fresh hearing feeling may be brought to the user. In some implementations, the computing device 102 may further select, from the plurality of corresponding melody feature parameters, a melody feature parameter which is previously selected most frequently, as the first melody feature parameter. In addition, in some implementations, the user may further perform modifications to the selected first melody feature parameter. These modifications may be stored, as the basis for subsequently determining "first melody feature parameter", thereby making the music style of the generated melody closer to the user's preferences.

In some implementations, a learning model may be pre-built to determine mapping or correspondence between the user's emotion and/or environment information and one or more predetermined music styles. This, for example, may be achieved by using the user's emotion and/or environment information with a specific music style label to train the learning model. Upon use, the computing device 102 may use the detected user emotion and/or environment information 104 as an input to the learning model, and obtain one or more music styles matching with the user's emotion and/or environment information 104 through the learning model.

In addition, in some implementations, the computing device 102 may present the determined one or more music styles to the user, and may receive the user's modifications to the determined music style. These modifications may further be stored, as the basis for subsequently determining the music style.

Figure 3:
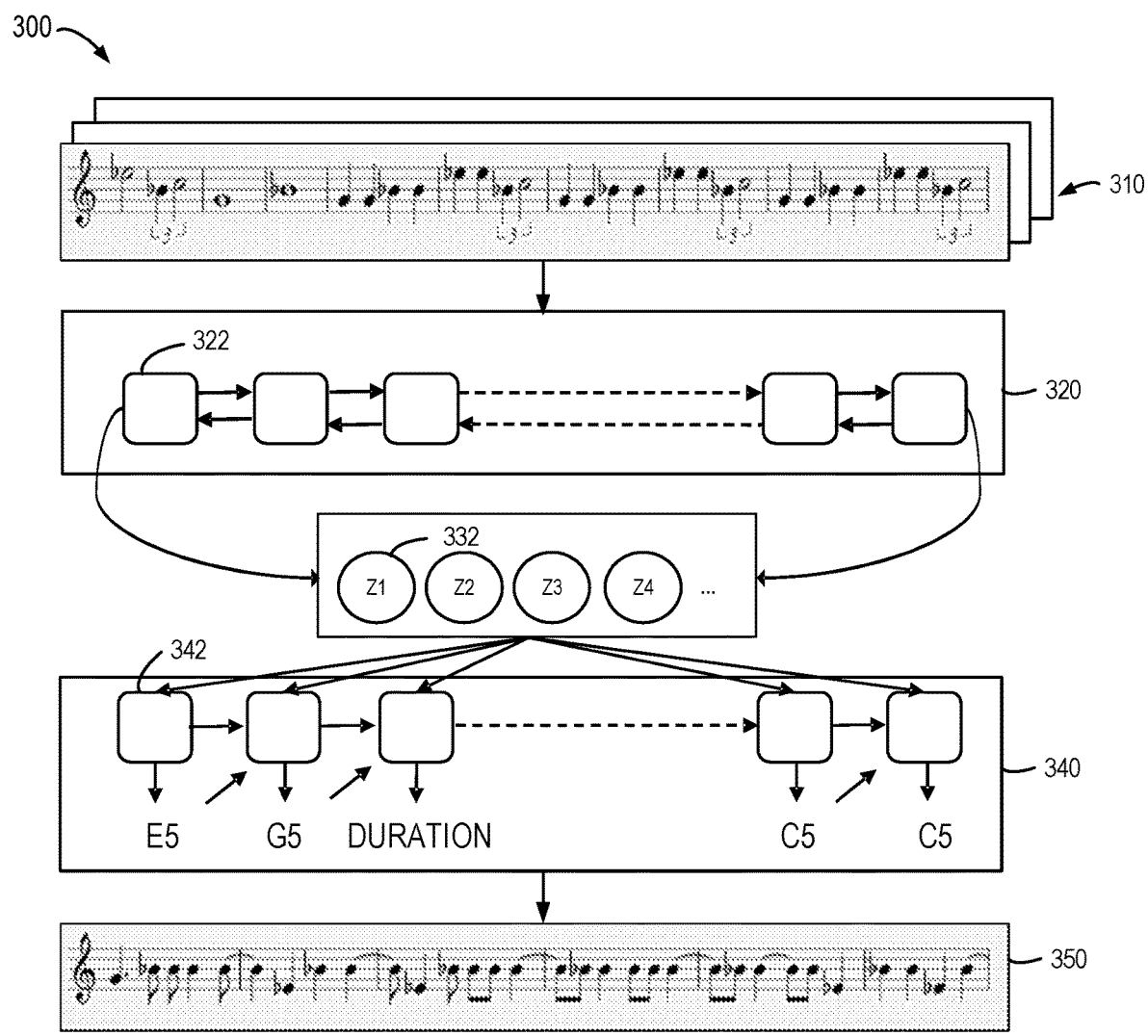
FIG. 3 illustrates a schematic diagram of using a VAE model to generate a melody according to some implementations of the subject matter described herein.

In some implementations, a Variational Autoencoder (VAE) model may be used to determine the plurality of melody feature parameters. The VAE model is an important generation model, and it may for example be used for image generation and melody generation and the like. FIG. 3 illustrates a structural schematic diagram of a VAE model 300 according to some implementations of the subject matter described herein.

As shown in FIG. 3, the VAE model 300 comprises an encoder 320 and a decoder 340, wherein both the encoder 320 and decoder 340 are neural networks. The encoder 320 may encode input as an implicit vector Z, and the decoder 340 may use the implicit vector Z as an input, and generate an output similar to the input. The implicit vector Z may include a plurality of elements, which may form a normal distribution with a mean value 0 and a variance 1. In an implementation of melody generation, the input of the encoder 320 may be a melody, and the encoder 320 may extract a feature of the melody as the implicit vector, which may serve as the melody feature parameter. The decoder 340 may generate another melody based on the input implicit vector (namely, the melody feature parameter). Hence, when the melody feature parameter is to be generated, only the encoder 320 in the VAE model 300 would be used. The decoder 340 may generate a corresponding melody when the melody feature parameters are determined, as will be described in detail.

In order for the VAE model 300 to learn the ability to extract features and generate melodies, the parameters of the encoder 320 and the decoder 340 need to be trained during a training process. In the training process of the VAE model, a plurality of training melodies with different types of music styles may be used as model inputs to obtain a melody as an output, which is similar to the training melody. When a loss function of the output melody is not reduced any more, the training of the VAE model then can be terminated, thereby obtaining the trained encoder 320 and the trained decoder 340. The encoder 320 and decoder 340 of the VAE model may be trained using a variety of training methods, and the scope of this disclosure is not limited in this respect. Furthermore, the training melody used in the training of the VAE model may be the same as or be different from a subsequent reference melody for extracting the melody feature parameters.

After being trained, the trained encoder 320 can be utilized to extract the melody feature parameters for subsequent use. Specifically, the trained encoder 320 may analyze an association between a plurality of melody units 322 of the plurality of reference melodies 310, which are corresponding to one or more music styles, and further encode it as a corresponding plurality of melody feature parameters 332 (e.g., hidden vectors Z1, Z2, Z3, Z4, etc.), thereby establishing an association between music styles of the plurality of reference melodies 310 and the plurality of melody feature parameters 332. Each melody feature parameter 332 characterizes note distribution in the corresponding reference melody 310. These melody feature parameters 332 can be stored for selection.

Further referring to FIG. 2, at 230, based on the first melody feature parameter, the computing device 102 generates a first melody that conforms to the music style as an output melody 106 of computing device 102. Since that the first melody feature parameter characterizes the note distribution in one of the plurality of reference melodies and corresponds to the music style of the reference melody, the computing device 102 may automatically generate a melody using a plurality of melody generation methods based on the note distribution characterized by the selected first melody feature parameter and the indicated music style.

In some implementations, melody generation can be achieved by pre-training the melody generation model. As mentioned above, the VAE model can be used to perform melody generation. Such a melody-generating process will be described in detail below in conjunction with the VAE model 300 depicted in FIG. 3.

In the VAE model 300 of FIG. 3, the trained decoder 340 can be used to decode a particular melody feature parameter to generate a first melody 106. Accordingly, the computing device 102 may use a first melody feature parameter, which is selected from a plurality of melody feature parameters 332 based on user emotion and/or environmental information, as an input to decoder 340 to generate a corresponding melody 106. The VAE model 300 is trained such that the decoder 340 generates an output melody that is different from the input melody. Thus, the melody 106 generated by the decoder 340 is generally different from the reference melody 310, which is used to extract the first melody feature parameter 332.

In some implementations, to generate a melody more different from the known reference melody 310 or to generate a greater number of different melodies, the computing device 102 may also conduct a particular transform on the first melody feature parameter 332 to obtain the input to the decoder 340. For example, the computing device 102 may obtain a new melody feature parameters by adding random noises to the first melody feature parameter 332, and input it to decoder 340. Such a melody feature parameter transformation can prevent the generated melody from being too similar to the reference melody. In some implementations, the change to the first melody feature parameter would ensure that the music style corresponding to the transformed melody feature parameter does not change.

In some examples, the decoder 340 may generate, based on the first melody feature parameter 332 or the transformed melody feature parameter, the melody 106 per a melody unit (e.g., a note or syllable). In some cases, in addition to the melody feature parameters, the generation of the latter melody unit is also based on the previous melody unit. FIG.

3 shows an example in which the decoder 340 generates a melody 106 by note. It is assumed that a generating function of each note can be expressed as f(Z, H, O), wherein Z represents a transformed melody feature parameter (a transformed hidden vector), H represents an internal parameter of the trained decoder 340, and O represents the previous note generated. As shown in FIG. 3, as for the second note in the melody 106 to be generated, its generation function can be expressed as f(Z, H, E5), wherein E5 represents a first note that has been determined. Thus, the second note for example may be determined as G5. Subsequent notes in the melody 106 can be generated in a similar manner. Furthermore, as for the generation of an initial note, the previous note O in the generation function can be set as a default value.

In some implementations, as shown in FIG. 3, each note may be output as a particular musical scale (e.g., E5, G5, or C5). In some implementations, notes can also be output as a "duration" marker to indicate the duration of the previous note. In this manner, the first melody 106 that conforms to a particular music style can be automatically generated to provide the user with a new-created melody that matches with the user's emotion and/or environmental information 104. In addition, due to the randomness brought by the VAE model and the appropriate transformation applied to the melody feature parameters, the obtained melody will be different from the reference melody used, while keeping the music style of the reference melody.

In some implementations, upon completion of the generation of the first melody, the computing device 102 may also generate, based on the first melody, a second melody with the same music style to the first melody for output. For example, the first melody 250 may comprise 16 notes. Different from the generation process of an initial note of the first melody, the last note (for example, C5) of the first melody may be used as one of input parameters for determining the initial note of the second melody, to iteratively generate the second melody. Since an input melody feature parameter Z in the note generation function and an internal parameter H of the decoder 340 remain unchanged during the generation of the second melody, the generated second melody can have the same music style as the first melody. In this manner, the computing device 102 can generate a plurality of melodies that matches with the user's emotion and/or environmental information 104 for playing to the user. The method of generating and presenting almost "infinite" melody can overcome the feeling of segmentation caused by melody switching. Therefore, such a solution solves the problem that only a fixed-length melody can be generated in a solution that a melody is generated based on a template conventionally.

The above describes an example implementation of a process through which the computing device 102 selects a single melody feature parameter to generate a melody based on user emotion and/or environmental information. In some implementations, the computing device 102 may obtain different user emotion and/or environmental information from one or more sources such that multiple music styles that match with user emotion and/or environmental information may be determined. Alternatively, the computing device 102 can determine that a single user emotion and/or environmental information matches with a plurality of music styles. In these cases, the computing device 102 may select melody feature parameters (e.g., a first melody feature parameter and a second melody feature parameter) that respectively correspond to a plurality of music styles. For example, the computing device 102 may determine that user emotion and/or environmental information 104 matches with both music styles "happy" and "rock and roll". After determining the first melody feature parameter corresponding to the music style "happy", the computing device 102 may also select the second melody feature parameter corresponding to the music style "rock and roll" from the plurality of melody feature parameters in a similar manner.

In some implementations, the computing device 102 may generate, based on the first melody feature parameter and the second melody feature parameter, a new melody feature parameter (referred to as a "third melody feature parameter" for ease of description) for use in melody generation. In some implementations, since the melody feature parameters can be vectorized, the computing device 102 may obtain the third melody feature parameter by linearly combining the first melody feature parameter and the second melody feature parameter. In these implementations, the computing device 102 can decode the obtained third melody feature parameter using the trained decoder 340 to generate a first melody. Since the third melody feature parameter is a combination of the first melody feature parameter and the second melody feature parameter, the generated first melody will have a corresponding plurality of music styles at the same time, for example, both "happy" and "rock and roll" music styles.

In some implementations, when the computing device 102 detects a change in user emotion and/or environmental information 104, the computing device 102 may determine a new melody feature parameter corresponding to the new user emotion and/or environmental information 104, and generate a melody that conforms to the new music style based on the new melody feature parameter. For example, when the computing device 102 detects that the speed of driving the vehicle is switched from slow to fast, the music style can also for example be switched from country music corresponding to slow driving to rock and roll music corresponding to fast driving, thereby matching with the new user emotion and/or environmental information 104.

Figure 4:
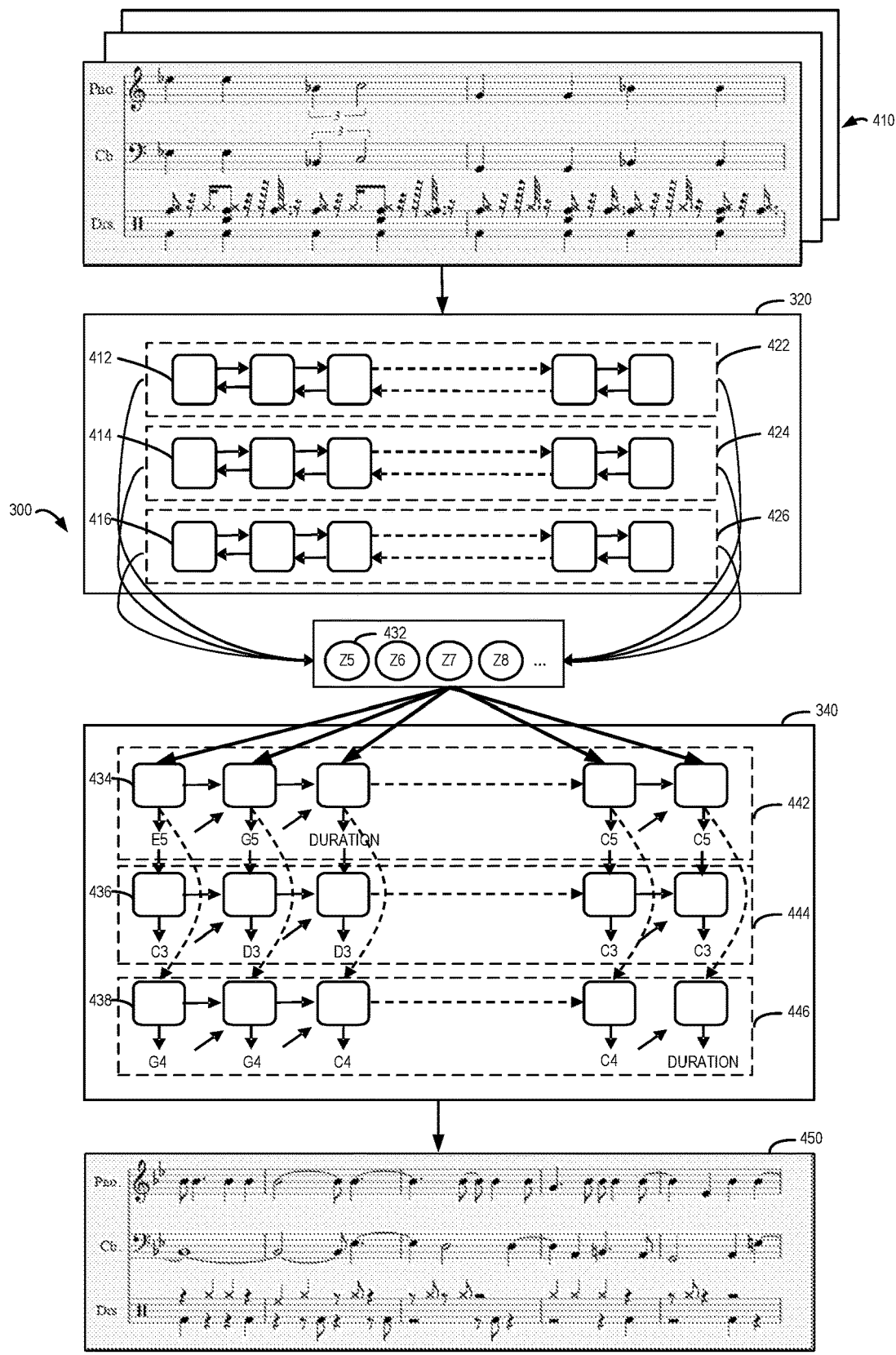
FIG. 4 illustrates a schematic diagram of using a VAE model to generate a melody according to some other implementations of the subject matter described herein.

In some implementations, in order to make the generated melody richer, it may be desirable to generate different tracks (corresponding to different instruments). In such an implementation, the encoder of the VAE model may be used to respectively encode different tracks of the reference melody and use the decoder of the VAE model to generate melodies corresponding to different tracks. FIG. 4 shows an example of a VAE model 300 that can be used to implement encoding and decoding of different tracks of a melody.

As shown in FIG. 4, the encoder 320 can be implemented as a plurality of track encoders, including a piano track encoder 422, a bass track encoder 424, and a drum track encoder 426, which may be used to encode the plurality of tracks included in the melody respectively to extract corresponding track features. Further, the decoder 340 can be implemented as a plurality of track decoders, including a piano track decoder 442, a bass track decoder 444, and a drum track decoder 446 to generate a melody containing a plurality of tracks.

With respect to the VAE model 300 of FIG. 4, during the training process, a training melody including a plurality of tracks (e.g., piano track, drum track, and bass track) may be used as a training input for the multi-layer VAE model to generate an output melody that also comprises multiple tracks. When the loss function of the output melody is not reduced any longer, the training of the VAE model can be terminated, thereby obtaining the plurality of track encoders 422, 424, and 426 included in the trained encoder 320 and the plurality of track decoders 442, 444 and 446 included in the decoder 340.

After being trained, the track encoders 422, 424, and 426 in the encoder 320 can be utilized to encode a plurality of melody units 412, 414, and 416 respectively in respective tracks (e.g., piano track, bass track, and drum track) in one or more reference melodies 410, to obtain a corresponding plurality of track features. Each track feature characterizes the note distribution in the corresponding track. The encoder 320 may also combine the obtained plurality of track features to determine a melody feature parameter 432 (e.g., hidden vectors Z5, Z6, Z7, Z8, etc.) corresponding to the reference melody 410, and establish the association between the music style of the reference melody 410 and the melody feature parameter 432. The extracted melody feature parameter 432 characterizes the note distribution of each track in the reference melody 410. As described above, where the music style associated with the user's emotion and/or environmental information 104 is determined, the melody feature parameter 432 matching with the user's emotion and/or environmental information 104 may be selected from the plurality of melody feature parameters based on the association between the music style and the melody feature parameter 432.

Similarly, in the melody generation process, if the melody feature parameter 432 is selected, the melody feature parameter can be used for melody generation (e.g., can be directly input to the encoder 340, be input to the decoder 340 after appropriate transformation, or be combined with other melody features parameters and then input to the decoder 340). Then, the corresponding track decoders 442, 444, 446 in the decoder 340 decode the input melody feature parameters to generate corresponding tracks (e.g., piano track, bass track, and drum track). These tracks will construct a melody 106. In some implementations, unlike the decoding process discussed with respect to FIG. 3, in the VAE model of FIG. 4, the generation function of one or more notes 434, 436, and 438 in the plurality of tracks takes into account not only the input melody feature parameters, internal parameters of the decoder, and the generated previous note, but also takes into account note output of the corresponding one or more tracks. For example, the decoder corresponding to the drum track will also use the notes of the generated piano track and the notes of the generated bass track as input parameters during the decoding process.

Based on such a VAE model, the computing device 102 can automatically create a richer melody to enhance the user's auditory experience.

Example Implementations

Some example implementations of the present disclosure are listed below.

In one aspect, the present disclosure provides a computer-implemented method comprising: detecting a user emotion and/or environmental information; selecting a first melody feature parameter from a plurality of melody feature parameters based on the user emotion and/or environmental information, each of the plurality of melody feature parameters corresponding to a music style of one of a plurality of reference melodies; and generating a first melody confirming to the music style based on the first melody feature parameter, the first melody being different from the reference melodies.

In some implementations, the method further comprises: generating a second melody adjacent to the first melody based on the first melody, the second melody being different from the first melody, and the music style of the second melody being the same as the music style of the first melody.

In some implementations, the method further comprises: determining the plurality of melody feature parameters by encoding the plurality of reference melody using a Variational Autoencode (VAE) model.

In some implementations, determining the plurality of melody feature parameters comprises: for each melody feature parameter, encoding a plurality of tracks in the reference melody with the VAE model to determine a plurality of track features corresponding to the plurality of tracks, each track feature characterizing a note distribution in a corresponding track; and determining the melody feature parameter by combining a plurality of track features.

In some implementations, generating the first melody comprises: generating a plurality of tracks in the first melody based on the first melody feature parameter.

In some implementations, generating the first melody based on the first melody feature parameter further comprises: selecting a second melody feature parameter from the plurality of melody feature parameters based on the user emotion and/or the environmental information; generating a third melody feature parameter based on the first melody feature parameter and the second melody feature parameter; and generating the first melody based on the third melody feature parameter.

In some implementations, the music style comprises different musical genres and/or different emotional tags.

In another aspect, the present disclosure provides a device. The apparatus comprises: a processing unit; and a memory coupled to the processing unit and comprising instructions stored thereon which, when executed by the processing unit, cause the device to perform acts of: detecting a user emotion and/or environmental information; selecting a first melody feature parameter from a plurality of melody feature parameters based on the user emotion and/or the environmental information, each of the plurality of melody feature parameters corresponding to a music style of one of a plurality of reference melodies; and generating a first melody conforming to the music style based on the first melody feature parameter, the first melody being different from the reference melodies.

In some implementations, the acts further comprise: generating a second melody adjacent to the first melody based on the first melody, the second melody being different from the first melody, and a music style of the second melody being the same as the music style of the first melody.

In some implementations, the acts further comprise: determining the plurality of melody feature parameters by encoding the plurality of reference melodies with a Variational Autoencode (VAE) model.

In some implementations, determining the plurality of melody feature parameters comprises: for each melody feature parameter, encoding a plurality of tracks in the reference melody with the VAE model to determine a plurality of track features corresponding to the plurality of tracks, each track feature characterizing a note distribution in a corresponding track; and determining the melody feature parameter by combining the plurality of track features.

In some implementations, generating the first melody comprises: generating a plurality of tracks in the first melody based on the first melody feature parameter.

In some implementations, generating the first melody based on the first melody feature parameter further comprises: selecting a second melody feature parameter from the plurality of melody feature parameters based on the user emotion and/or the environmental information; based on the first melody feature parameter and a second melody feature parameter, generating a third melody feature parameter based on the first melody feature parameter and the second melody feature parameter; and generating the first melody based on the third melody feature parameter.

In some implementations, the music style comprises different musical genres and/or different emotional tags.

In another aspect, the present disclosure provides a computer program product being tangibly stored in a non-transitory computer storage medium and comprising machine executable instructions which, when executed by a device, cause the device to: detect a user emotion and/or environmental information; select a first melody feature parameter from a plurality of melody feature parameters based on the user emotion and/or the environmental information, each of the plurality of melody feature parameters corresponding to a music style of one of a plurality of reference melodies; and generate a first melody conforming to the music style based on the first melody feature parameter, the first melody being different from the reference melodies.

In some implementations, the machine executable instructions, when executed by the device, further cause the device to: generate a second melody adjacent to the first melody based on the first melody, the second melody being different from the first melody, and a music style of the second melody being the same as the music style of the first melody.

In some implementations, the machine executable instructions, when executed by the device, further cause the apparatus to: determine the plurality of melody feature parameters by encoding the plurality of reference melodies with a Variational Autoencode (VAE) model In some implementations, the machine executable instructions, when executed by the device, further cause the device to: for each melody feature parameter, encode a plurality of tracks in the reference melody with the VAE model to determine a plurality of track features corresponding to the plurality of tracks, each track feature characterizing a note distribution in a corresponding track; and determine the melody feature parameter by combining the plurality of track features.

In some implementations, the machine executable instructions, when executed by the device, further cause the device to: generate a plurality of tracks in the first melody based on the first melody feature parameter.

In some implementations, the machine executable instructions, when executed by the device, further cause the device to: select a second melody feature parameter from the plurality of melody feature parameters based on the user emotion and/or the environmental information; based on the first melody feature parameter and a second melody feature parameter, generate a third melody feature parameter based on the first melody feature parameter and the second melody feature parameter; and generate the first melody based on the third melody feature parameter.

In some implementations, the music style comprises different musical genres and/or different emotional tags.

The functionally described herein can be performed, at least in part, by one or more hardware logic components For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
    detecting a user emotion and/or environmental information;
    selecting a first melody feature parameter corresponding to a first reference melody from a plurality of melody feature parameters based on the user emotion and/or the environmental information, each of the plurality of melody feature parameters corresponding to a respective one of a plurality of reference melodies, wherein each reference melody is encoded via an encoder of a variational autoencoder (VAE) trained on the reference melodies to generate the plurality of melody, feature parameters; and generating, via a decoder of the VAE, a first melody conforming to the music style based on the first melody feature parameter; the first melody being different from the first reference melody.

2. The method according to claim 1, further comprising: generating a second melody adjacent to the first melody based on the first melody, the second melody being different from the first melody, and a music style of the second melody being the same as the music style of the first melody.

3. The method according to claim 1, wherein determining the plurality of melody feature parameters comprises: for each melody feature parameter,
encoding a plurality of tracks in the reference melody with the VAE model to determine a plurality of track features corresponding to the plurality of tracks; each track feature characterizing a note distribution in a corresponding track; and
determining the melody feature parameter by combining the plurality of track features.

4. The method according to claim 1, wherein generating the first melody comprises:
generating a plurality of tracks in the first melody based on the first melody feature parameter.

5. The method according to claim 1, wherein the music style comprises different musical genres and/or different emotion tags.

6. The method of claim 1 wherein generating the first melody based on the first melody feature parameter further comprises:
selecting a second melody feature parameter from the plurality of melody feature parameters based on the user emotion and/or the environmental information;
generating a third melody feature parameter based on the first melody feature parameter and the second melody feature parameter; and
generating the first melody based on the third melody feature parameter.

7. The method of claim 1 and further comprising adding noise to the first melody feature parameter prior to generating the first melody.

8. The method of claim 1 wherein the first melody comprises a first note, and further comprising generating succeeding notes via the decoder wherein each succeeding note is generated based on the first melody feature parameter and a preceding generated note.

9. A device, comprising:
a processing unit; and
a memory coupled to the processing unit and comprising instructions stored thereon which, when executed by the processing unit, cause the device to perform acts of:
detecting a user emotion and/or environmental information;
selecting a first melody feature parameter corresponding to a first reference melody from a plurality of melody feature parameters based on the user emotion and/or the environmental information, each of the plurality of melody feature parameters corresponding to a respective one of a plurality of reference melodies, wherein each reference melody is encoded via an encoder of a variational autoencoder (VAE) trained on the reference melodies to generate the plurality of melody feature parameters; and
generating, via a decoder of the VAE, a first melody conforming to the music style based on the first melody feature parameter, the first melody being different from the first reference melody.

10. The device according to claim 9, wherein the acts further comprise:
generating a second melody adjacent to the first melody based on the first melody, the second melody being different from the first melody, and a music style of the second melody being the same as the music style of the first melody.

11. The device according to claim 9, wherein determining the plurality of melody feature parameters comprises: for each melody feature parameter,
encoding a plurality of tracks in the reference melody with the VAE model to determine a plurality of track features corresponding to the plurality of tracks, each track feature characterizing a note distribution in a corresponding track; and
determining the melody feature parameter by combining the plurality of track features.

12. The device according to claim 9, wherein generating the first melody comprises:
generating a plurality of tracks in the first melody based on the first melody feature parameter.

13. The device according to claim 9, wherein the music style comprises different musical genres and/or different emotion tags.

14. The device of claim 9 wherein generating the first melody based on the first melody feature parameter further comprises:
selecting a second melody feature parameter from the plurality of melody feature parameters based on the user emotion and/or the environmental information;
generating a third melody feature parameter based on the first melody feature parameter and the second melody feature parameter; and
generating the first melody based on the third melody feature parameter.

15. The device of claim 9 wherein the acts further comprise adding noise to the first melody feature parameter prior to generating the first melody.

16. The device of claim 9 wherein the first melody comprises a first note, and further comprising generating succeeding notes via the decoder wherein each succeeding note is generated based on the first melody feature parameter and a preceding generated note.

17. A non-transitory computer program product being tangibly stored in a computer storage medium and comprising machine executable instructions which, when executed by a device, cause the device to:
detect a user emotion and/or environmental information;
select a first melody feature parameter corresponding to a first reference melody from a plurality of melody feature parameters based on the user emotion and/or the environmental information, each of the plurality of melody feature parameters corresponding to a respective one of a plurality of reference melodies, wherein each reference melody is encoded via an encoder of a variational autoencoder (VAE) trained on the reference melodies to generate the plurality of melody feature parameters; and
generate, via a decoder of the VAE, a first melody conforming to the music style based on the first melody feature parameter, the first melody being different from the first reference melody.

18. The non-transitory computer program product of claim 17 wherein generating the first melody based on the first melody feature parameter further comprises:
- selecting a second melody feature parameter from the plurality of melody feature parameters based on the user emotion and/or the environmental information;
- generating a third melody feature parameter based on the first melody feature parameter and the second melody feature parameter; and
- generating the first melody based on the third melody feature parameter.

19. The non-transitory computer program product of claim 17 wherein the executed instructions further cause the device to add noise to the first melody feature parameter prior to generating the first melody.

20. The non-transitory computer program product of claim 17 wherein the first melody comprises a first note, and further comprising generating succeeding notes via the decoder wherein each succeeding note is generated based on the first melody feature parameter and a preceding generated note.

* * * * *